No. 859,010. PATENTED JULY 2, 1907.
J. PARRIS.
MACHINE FOR WINDING A WIRE OR OTHER PROTECTOR AROUND
A FLEXIBLE HOSE PIPE.
APPLICATION FILED APR. 30, 1906.

Inventor:
John Parris.

By:
Alexander & Dowell
Attorneys.

Witnesses:
James R. Mansfield.
L. E. Wilhelm.

UNITED STATES PATENT OFFICE.

JOHN PARRIS, OF KENSINGTON, VICTORIA, AUSTRALIA.

MACHINE FOR WINDING A WIRE OR OTHER PROTECTOR AROUND A FLEXIBLE HOSE-PIPE.

No. 859,010.  Specification of Letters Patent.  Patented July 2, 1907.

Application filed April 30, 1906. Serial No. 314,590.

*To all whom it may concern:*

Be it known that I, JOHN PARRIS, a subject of the King of Great Britain and Ireland, residing at 32 Gloster street, Kensington, in the county of Bourke, State of Victoria, Commonwealth of Australia, have invented certain new and useful Improvements in Machines for Winding a Wire or other Protector Around Flexible Hose-Pipes, of which the following is a specification.

My invention relates to rubber or other flexible hose pipes which require a metallic yet flexible protector wound around their exterior. In the past this metallic protector has been applied in various ways, some of which were both inconvenient and costly.

The object of my invention is to provide a machine which will perform the operation without either injury or disfigurement to the hose, and which will also form a tight contact with the said hose and accomplish it with both despatch and little labor.

Figure 1:
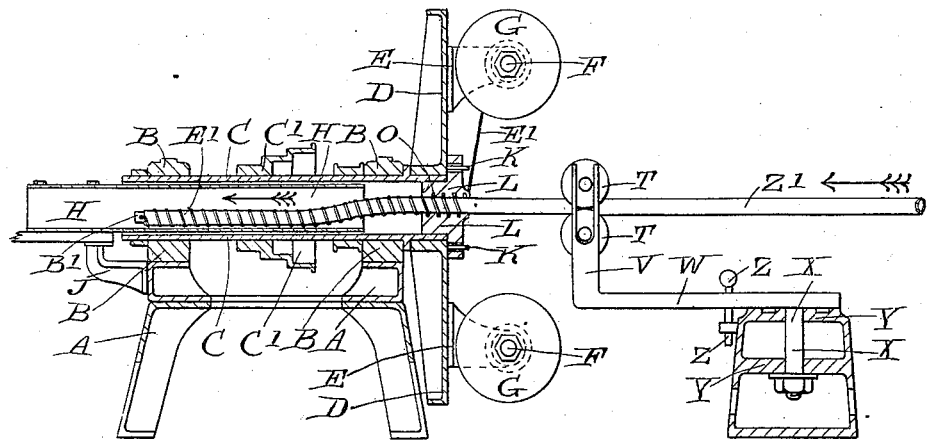
Figure 2:
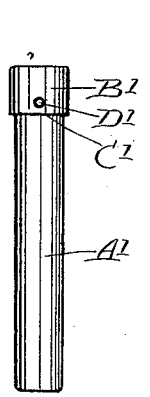
Figure 3:
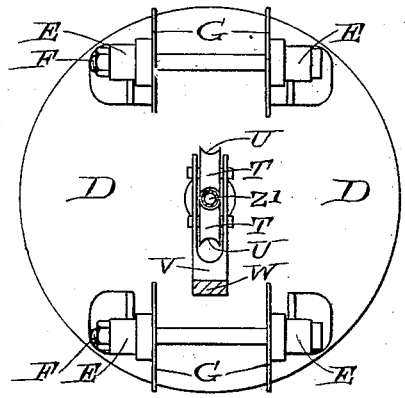
Figure 4:
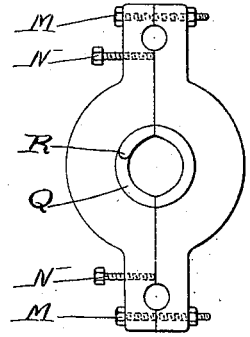
Figure 5:
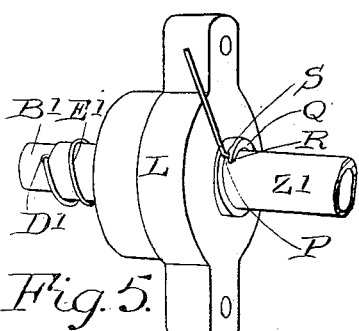

Referring to the drawings which form a part of this specification Figure 1 is a side sectional elevation of my invention. The feed nut is in place and the pipe is being drawn into it in an unprotected state and discharged from it wired or protected. Fig. 2 is a view of a plug. Fig. 3 is a front view of the reel carrying plate. Fig. 4 is an elevation, on a larger scale, of a split feed nut. Fig. 5 is a perspective view of a solid feed nut which is removed from the reel carrying plate. One wire only is being fed to the pipe and the first or entering groove or thread is clearly seen.

Similar letters of reference indicate similar or corresponding parts where they occur in the several views.

My invention includes a frame A above which are bearings B. In these bearings rotate a hollow spindle C driven by a variable speed cone pulley $C^1$ or other means. Attached to one overhanging end of the said hollow spindle is the rotating reel carrying plate D. To this reel carrying plate are attached reel bearings E. In these bearings are reel spindles F, upon which turn the flanged reels G. The desired tension upon the flanged reels G may be obtained by the nuts on the reel spindles F by springs or by other means. Upon one or both of the said flanged reels is placed the wire or like material to be wound around the pipe. If two wires are to be coiled around the pipe both reels are drawn from at once, whereas if only one wire is to be coiled only one is used. Inside the hollow spindle is a stationary overhanging receiving tube H. One end of this is secured to a bracket J attached to the frame of the machine. The length of the overhanging portion of the said receiving tube, as also its shape will depend upon circumstances. Protruding from the reel carrying plate are feed nut driving studs K. These drive a feed nut hereinafter described. If necessary they may have nuts upon the outer end or the said feed nuts may be retained to the reel carrying plate in any other well known way.

Fitting upon the driving studs K and in the center of the plate is the split or solid feed nut L. When split this consists of two halves held together by bolts M. In each half is a hole to accommodate a driving stud and there is also a separating screw N. These separating screws enable the two halves to be separated and thereby admit a larger pipe into the said nut. The mouths of the holes near the joint are enlarged. Through the center of the said feed nut is a feed hole around which is a spiral feed groove or thread O. The pitch of this will depend upon the pitch that the wire or other material to be wound upon the pipe is to assume. Instead of there being a square groove as shown it may be round at the roots and at the points, or be of any other shape. Instead of there being one groove, there may be two. The first entering groove in the hole is marked P (see Fig. 5). The front or leading in end Q protrudes and has a guideway R therein. Over the back edge S (hereinafter called the rubbing edge) of the guideway the wire or other material to be wound, rubs in its passage from the reel to the pipe. The said rubbing edge may, if necessary, be provided with a roller or series of rollers.

Opposite to the reel carrying plate as seen in Fig. 1 are two pipe holding wheels T placed edge to edge. These have circular grooves U therein and the said grooves may be covered with emery cloth or any pipe gripping material, or they may be roughened or circumferentially recessed in any well known way to prevent the pipe from turning. The bearing V supporting the said wheels is so designed that one or both of the wheels can be removed or replaced without difficulty. Below the bearings V and preferably integral therewith is a turn table arm W. This is attached to the top of a turn pin X. Said turn pin X turns within a standard Y and is locked in the position shown in Fig. 1 by a locking pin Z. In the end of the pipe $Z^1$ to be protected I insert a wooden or other plug. This has a shank $A^1$ and a head $B^1$ between which head and shank is a step or shoulder $C^1$. In the head of the plug is a wire holding hole or holes $D^1$.

The cycle of operations with my invention is as follows:—The pipe $Z^1$ to be protected, has inserted therein the shank $A^1$ of the plug, so that the step $C^1$ bears against the pipe end. The operator then places the plug head near the feed nut L and passes into one of the wire holding holes $D^1$, the end of the protecting wire $E^1$. He then bends the wire partially around the plug and passes the plug head into the feed nut so that the protecting wire $E^1$ enters into the first or entering groove P. He then holds the pipe to prevent it from turning and starts the machine. This turns the hollow spindle C, the reel carrying plate D, and with it the feed nut L. As the feed nut and the reel carrying plate rotate the protecting wire E¹ is drawn from the reel and into the groove P. As it is drawn into the grooves O the pipe is moved longitudinally as seen by the direction of the arrow shown in Fig. 1. When once the pipe has commenced passing into the hollow spindle C the operator turns the pipe holding wheels T in the direction shown in Fig. 1. He then elevates the top wheel to rest the pipe on the groove in the top of the bottom one. The locking pin Z is now dropped into position. The pipe continues moving toward the stationary overhanging receiving tube H, from the outer end of which it is discharged ready for use.

Having now described my invention, what I claim as new and desire to secure by Letters Patent is:—

1. In a machine for wiring hose, the combination of a rotatable spindle, a reel-carrier connected to one end thereof, a feed-nut having an internal wire-guiding-thread and provided with a projecting end having a wire entering groove provided with a rubbing edge, and means for connecting the wire end to the end of the hose.

2. In a machine for wiring hose, the combination of a rotatable spindle, a reel-carrier connected to one end thereof, and a feed-nut provided with eyes adapted to engage studs on the reel-carrier and cause it to rotate therewith, said feed-nut having an internal wire-guiding-thread and provided with a projecting end having a wire entering groove, substantially as described.

3. The herein described machine, comprising a tubular rotatable spindle, a reel-carrier on one end thereof provided with studs, a removable feed-nut having eyes adapted to engage the studs on the reel-carrier, and a cylindric portion adapted to enter the spindle and also having an internal wire-guiding-and feeding-thread, and a projecting portion having a wire entering groove connecting with the thread.

4. The combination of a tubular rotatable spindle, a receiving tube in one end thereof, a reel-carrier on the opposite end thereof, a removable feed-nut formed in two sections, and means for adjustably connecting the sections, said nut having a cylindric portion adapted to enter the spindle and having an internal wire-guiding-and feed-thread, and a wire entering groove connecting with the thread.

5. The herein described machine, comprising a tubular rotatable spindle, a reel-carrier on one end thereof provided with studs, a removable feed-nut having eyes adapted to engage the studs on the reel-carrier, and a cylindric portion adapted to enter the spindle and also having an internal wire-guiding-and feeding-thread, and a projecting portion having a wire entering groove connecting with the thread; with means for attaching the end of the wire to a hose to enter same into the feed-nut, and means for supporting the entering hose adjacent the feed-nut.

In testimony whereof I affix my signature in the presence of two subscribing witnesses.

JOHN PARRIS.

Witnesses:
 EDWIN PHILLIPS,
 CECIL M. PLASTRIER.